US012592259B2

(12) United States Patent
Lawrence et al.

(10) Patent No.: US 12,592,259 B2
(45) Date of Patent: Mar. 31, 2026

(54) SYSTEMS AND METHODS TO EDIT VIDEOS TO REMOVE AND/OR CONCEAL AUDIBLE COMMANDS

(71) Applicant: Intel Corporation, Santa Clara, CA (US)

(72) Inventors: Sean J. W. Lawrence, Bangalore (IN); Deepti Patil, Bangalore (IN)

(73) Assignee: Intel Corporation

( * ) Notice: Subject to any disclaimer, the term of this patent is extended or adjusted under 35 U.S.C. 154(b) by 685 days.

(21) Appl. No.: 17/849,050

(22) Filed: Jun. 24, 2022

(65) Prior Publication Data

US 2022/0319550 A1     Oct. 6, 2022

(51) Int. Cl.
*G11B 27/031*     (2006.01)
*H04N 9/802*     (2006.01)

(52) U.S. Cl.
CPC ........... *G11B 27/031* (2013.01); *H04N 9/802* (2013.01)

(58) Field of Classification Search
CPC ..... G11B 27/031; G11B 27/02; G11B 27/022; G11B 27/029; G11B 27/036; H04N 9/802; G06V 20/49

USPC ......................................................... 386/282
See application file for complete search history.

(56) References Cited

U.S. PATENT DOCUMENTS

2017/0148488 A1*  5/2017  Li ........................ G11B 27/034
2022/0108692 A1*  4/2022  Parkinson .............. G10L 15/22

* cited by examiner

*Primary Examiner* — Thai Q Tran
*Assistant Examiner* — Nienru Yang
(74) *Attorney, Agent, or Firm* — Hanley, Flight & Zimmerman, LLC

(57)     ABSTRACT

Systems and methods to edit videos having voice commands are disclosed herein. An example video editing system includes memory, machine readable instructions, processor circuitry to at least one of instantiate or execute the machine readable instructions to: detect an audible command in audio data, the audible command to control at least one of a function, an operation, a setting, or a state of a controllable device, edit the audio data to remove the audible command, and cause a file including video data and the audio data to be saved.

18 Claims, 8 Drawing Sheets

VIDEO EDITING
SYSTEM
120

114

108

104

110

102

116

106

NETWORK

112

SYSTEMS AND METHODS TO EDIT VIDEOS TO REMOVE AND/OR CONCEAL AUDIBLE COMMANDS

FIELD OF THE DISCLOSURE

This disclosure relates generally to video editing and, more particularly, to systems and methods to edit videos to remove and/or conceal audible commands.

BACKGROUND

Cameras include different usage controls such as changing a focus setting, starting a recording, capturing an image, setting a flash, zooming, etc. Typically, control of a camera is performed by manual interaction with the camera.

BRIEF DESCRIPTION OF THE DRAWINGS

In general, the same reference numbers will be used throughout the drawing(s) and accompanying written description to refer to the same or like parts. The figures are not to scale.

Figure 1:
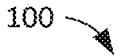
FIG. 1 illustrates an example system including an example electronic device implementing an example video editing system constructed in accordance with teachings of this disclosure.
Figure 1:
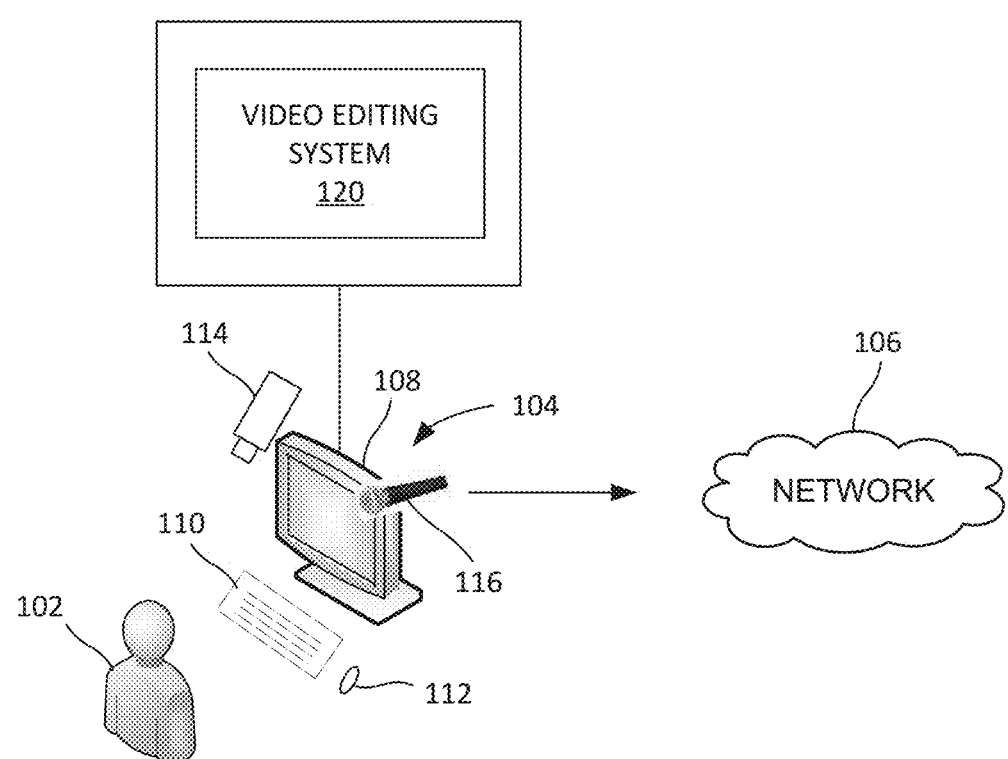

Unless specifically stated otherwise, descriptors such as "first," "second," "third," etc., are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name.

As used herein "substantially real time" refers to occurrence in a near instantaneous manner recognizing there may be real world delays for computing time, transmission, etc. Thus, unless otherwise specified, "substantially real time" refers to real time+/−1 second.

As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

As used herein, "processor circuitry" is defined to include (i) one or more special purpose electrical circuits structured to perform specific operation(s) and including one or more semiconductor-based logic devices (e.g., electrical hardware implemented by one or more transistors), and/or (ii) one or more general purpose semiconductor-based electrical circuits programmable with instructions to perform specific operations and including one or more semiconductor-based logic devices (e.g., electrical hardware implemented by one or more transistors). Examples of processor circuitry include programmable microprocessors, Field Programmable Gate Arrays (FPGAs) that may instantiate instructions, Central Processor Units (CPUs), Graphics Processor Units (GPUs), Digital Signal Processors (DSPs), XPUs, or microcontrollers and integrated circuits such as Application Specific Integrated Circuits (ASICs). For example, an XPU may be implemented by a heterogeneous computing system including multiple types of processor circuitry (e.g., one or more FPGAs, one or more CPUs, one or more GPUs, one or more DSPs, etc., and/or a combination thereof) and application programming interface(s) (API(s)) that may assign computing task(s) to whichever one(s) of the multiple types of processor circuitry is/are best suited to execute the computing task(s).

DETAILED DESCRIPTION

Cameras can be controlled to perform various functions and/or modify various settings, such as zooming in, zooming out, focusing on an object, changing filters, changing an f-stop, etc. A camera is typically controlled by physical interaction with the device via physical touch, such as turning a knob and/or pressing a button on the camera. Some cameras, such as those incorporated into and/or connected to an electronic device, can be controlled via input devices such as a mouse, a keyboard, a touchscreen, etc. For example, a user may touch an object on a screen thereby indicating to one or more processors to take an action such as, for example, causing the camera to change focus to the object selected by the user. In these examples, interacting with camera controls while recording a video or taking a photograph is cumbersome as it involves the use of at least one hand to interact with the camera and/or input devices.

Example systems (e.g., software and/or application based systems) enable a user to control a camera using voice-based controls, referred to herein as audible commands or voice commands. This is advantageous for users, such as content creators, that are live streaming and/or recording a video for uploading to a social media portal. For instance, a user might not be able to use one or both hands for performing the camera controls during the live stream. Instead, the user may issue voice commands to control certain functions, operations, settings, and/or states of the camera. For example, a user may be live streaming themselves while providing a review of a new product, such as a new phone. During the live streaming session, the user may stand in front of the camera and hold up the phone to explain the various features of the new phone. The user can verbally issue camera control commands, such as "zoom in," "zoom out," "focus on [object]," etc. The example system detects these camera voice commands and controls the camera to perform the intended function, operation, setting, and/or state. This enables the user to control the camera without having to physically touch the camera or another input device during the recording session. Therefore, the user can remain in front of the camera and carry-on with their review. Examples of systems that enable voice commands are disclosed in U.S. application Ser. No. 17/483,401, titled "Contextual Usage Control of Cameras," filed Sep. 23, 2021, which is hereby incorporated by reference in its entirety.

After the live streaming session, the user typically saves the recorded video and uploads it to a networked platform (e.g., YouTube®, Instagram®, etc.) for viewing by other persons at a later time. However, before uploading the recorded video, the user typically spends time editing the recorded video to remove the segments of the video where the user issues the verbal voice commands since they are not needed in the video and can be distracting to viewers. This editing process can be cumbersome and time consuming, and can also result in abrupt transitions in the video/audio. Otherwise, a user may retain the voice commands in the video, but this may result in an undesirable end product (e.g., an unprofessional level video).

Disclosed herein are example systems and methods that automatically edit a video to mute or remove the audio and/or video data corresponding to voice commands issued to create the video. Examples disclosed herein can edit a video on the fly (e.g., a video that is being recorded during a live streaming session) and/or edit a pre-recorded video. Due to such editing, a professional quality video can be created while saving the user significant editing time.

An example video editing system disclosed herein accesses video data output by a camera and audio data output by a microphone. In some examples, the video and audio data is accessed in substantially real time during a video recording session. In other examples, the video editing system accesses and/or analyzes video and/or audio data from a pre-recorded video file. The example video editing system analyzes the audio data to detect an audible command, referred to herein as a voice command. The terms "voice command," "audible command," "spoken command," "voice control," and variations thereof are used interchangeably herein, and are defined to be a verbal (e.g., spoken) command to control a function, operation, setting, and/or a state of a controllable device, such as a camera. For example, a user may issue a voice command of "zoom in," "zoom out," "zoom on [object]," etc. If the video editing system detects a voice command in the audio data, the video editing system edits the audio data to remove the voice command. Then the video editing system generates and saves a video file including the video data and the audio data (the modified audio data) but lacks the voice command audio and, in some examples, the video frame(s) corresponding to such spoken commands. As such, when the video file is played, the voice command is not heard. In some examples, this saves the user significant editing time because the editing is done automatically (e.g., without requiring user involvement).

In some examples, the video editing system edits the audio data by removing or concealing a portion of the audio data during a time segment corresponding to the voice command. For example, the video editing system can reduce the data in the time segment to a zero sample and/or filter the voice command out of the data, thereby muting the sound occurring during the time segment. In some such examples, the video data remains unedited. Therefore, when viewing the video, the voice command is not heard but the video is not effected. In other examples, the video editing system edits the audio data by replacing data in the audio data during the time segment with another audio clip. In some examples, the audio clip includes background sound from another segment of the audio data. In other examples, the video editing system completely removes the time segment of the video data and the audio data corresponding to voice command(s). This shortens the entire video by skipping over the part of the video (e.g., the video frame(s)) containing the voice command. Typically, the video and audio are stored in separate streams such that the audio or the video can be edited separately. Typically, if video frames are removed, the corresponding segment(s) of the audio stream will also be deleted to maintain synchronicity between the audio and video streams. In some examples, the video editing system determines whether to edit only the audio data or both the audio data and the video data based on whether a face of a person (e.g., the user) is present in the scene during the voice command. For example, if a face of a person is present in the video data during the voice command, the video editing system may completely remove the frame(s) (e.g., the time segment) of the video data and the audio data. Otherwise, if only the audio was removed, it may be confusing to viewers because the person could be seen moving their mouth but no sound is heard. If, on the other hand, a face of a person is not present in the scene during the voice command, the video editing system may only edit the audio data to remove the voice command. For example, the user (and/or the user's face) may be off-camera (e.g., out of the field of view of the camera) while issuing the voice command. In some such examples, only audio corresponding to the voice command is removed. Thus, the examples disclosed herein intelligently edit the audio and/or video streams to produce a professional quality video.

Turning to the figures, FIG. 1 illustrates an example video recording system 100 in which examples disclosed herein can be implemented. In the illustrated example, the video recording system 100 is used by a person or user 102. In some examples, the user 102 is a live streamer, such as live streamer on Twitch®, YouTube® Live, Facebook® Live, Instagram® Live, etc. In another example, the user 102 may be a content creator, such as a person that creates reviews of products and uploads them to the internet (e.g., to YouTube®, to a blog site, etc.). The example video recording system 100 includes an example electronic device 104. The user 102 can use the electronic device 104 to live stream the video feed over a network 106, such as the internet, to an audience (e.g., via social media platform or portal). Additionally or alternatively, the user 102 can use the electronic device 104 to record the live session as a video and upload the video to a platform (e.g., via YouTube®, etc.) to be viewed by one or more other persons at a later time (e.g., not as a live stream). In this example, the electronic device 104 is implemented as a desktop computer that includes an example display 108, an example keyboard 110, and an example mouse 112. However, in other examples, the electronic device 104 can be implemented by any other type(s) of electronic device, such as a smartphone, a tablet, a laptop computer, a game console, etc.

In the illustrated example, the example video recording system 100 includes a camera 114 and a microphone 116. The camera 114 outputs video data (sometimes referred to as a video feed or video stream) and the microphone 116 outputs audio data (sometimes referred to as an audio feed or audio stream). The electronic device 104 combines the video data and audio data to create a video or audio/video (A/V) file, which can be live streamed to one or more persons and/or recorded for viewing at a later time. The A/V file may use any known protocol or standard (e.g., MP4, MOV, WMV, etc.). The camera 114 and the microphone 116 can be physically connected (e.g., via one or more wires or cables) or wirelessly connected to the electronic device 104. In some examples, the camera 114 and the microphone 116 are discrete devices that are separate from the electronic device 104. For example, the camera 114 and the microphone 116 can be off-the-shelf devices that are connected (e.g., via USB cables) to the electronic device 104. In other examples, the camera 114 and the microphone 116 can be part of and/or physically integrated into the electronic device 104. For example, the electronic device 104 can be implemented as a computer (e.g., a laptop) with a built-in camera and microphone or a smartphone with a built-in camera and microphone. In some examples, the camera 114 and/or the microphone 116 are controlled by inputs from display 108, the keyboard 110, and/or the mouse 112. For example, the user 102 can input commands using the keyboard 110 and/or the mouse 112 to cause the camera 114 to focus, zoom in, zoom out, pan left, pan right, etc.

In the illustrated example, the video recording system 100 includes an example video editing system 120 implemented on the electronic device 104. The video editing system 120 may be implemented by instructions (e.g., as application or software) executed by processor circuitry of the electronic device 104. An example processor platform capable of implementing such instructions is disclosed in connection with FIG. 9. The video editing system 120 provides a platform or interface to view the live feed from the camera 114 on the display 108. The example video editing system 120 can also automatically edit or modify a video to remove and/or replace one or more voice commands issued by the user 102 during the recording session, to thereby generate a polished, professional-quality video. This also reduces or eliminates the time the user 102 spends editing the video.

Figure 2:
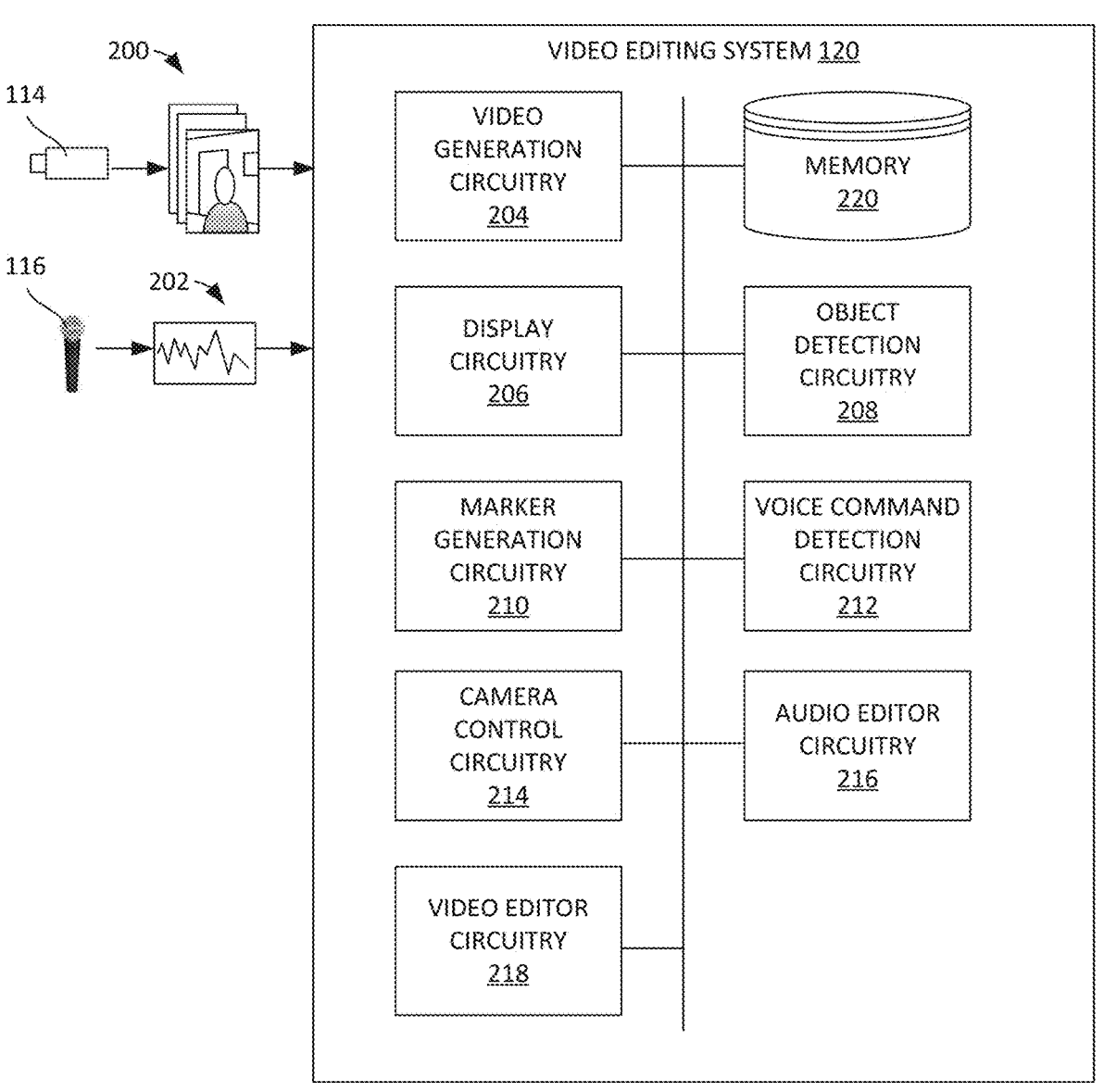
FIG. 2 is a block diagram of an example implementation of the example video editing system of FIG. 1.

FIG. 2 is a block diagram of an example implementation of the video editing system 120 of FIG. 1 for editing a video containing voice commands. The system 120 of FIG. 2 may be instantiated (e.g., creating an instance of, bring into being for any length of time, materialize, implement, etc.) by processor circuitry such as a central processing unit executing instructions. Additionally or alternatively, the system 120 of FIG. 2 may be instantiated (e.g., creating an instance of, bring into being for any length of time, materialize, implement, etc.) by an ASIC or an FPGA structured to perform operations corresponding to the instructions. It should be understood that some or all of the circuitry of FIG.

2 may, thus, be instantiated at the same or different times. Some or all of the circuitry may be instantiated, for example, in one or more threads executing concurrently on hardware and/or in series on hardware. Moreover, in some examples, some or all of the circuitry of FIG. 2 may be implemented by microprocessor circuitry executing instructions to implement one or more virtual machines and/or containers.

During a recording session, such as a live streaming session, the system 120 receives video data 200 output by the camera 114. The video data 200 includes a sequence of images or frames. The system 120 also receives audio data 202 output by the microphone 116. In some examples, the system 120 converts the audio data 202 from an analog signal to a digital signal. In the illustrated example, the system 120 includes example video generation circuitry 204, example display circuitry 206, example object detection circuitry 208, example marker generation circuitry 210, example voice command detection circuitry 212, example camera control circuitry 214, example audio editor circuitry 216, example video editor circuitry 218, and an example memory 220. In some examples, the circuitry 204-218 is instantiated by processor circuitry executing instructions and/or configured to perform operations such as those represented by the flowchart of FIG. 7.

The video generation circuitry 204 formats and/or stores the video data 200 and the audio data 202 as a video or A/V file using known standards or protocols such as MPEG, H.262, ACC, HTML5. In some examples, the video generation circuitry 204 saves the video file in the memory 220. Additionally, the system 120 can transmit (e.g., live stream) the video file and/or the audio and video streams in substantially real time out to a platform (e.g., a social media platform) and/or one or more users via the network 106. In some examples, the system 120 edits or modifies the video data 200 (e.g., packets and/or frames in a video stream) and/or the audio data 202 (e.g., packets in an audio stream), which the video generation circuitry 204 saves/records as a new or updated video file in the memory 220. The video file and/or the audio and video streams can be uploaded to a platform at a later time for viewing by one or more persons. In some examples, the system 120 edits the video data 200 and/or the audio data 202 in substantially real time as the data is received. Additionally or alternatively, the original video file can be saved, and then the video file can be analyzed and edited to create the new video file at some delay (e.g., seconds, hours, days, weeks, months, etc.). Further, the video data 200 (the live video feed) can be displayed on the display 108 (FIG. 1) while the user 102 (FIG. 1) is recorded. For example, the display circuitry 206 causes the video data 200 to be displayed on the display 108, which can be used as feedback to the user 102 while recording.

In the illustrated example, the object detection circuitry 208 analyzes the video data 200 and detects objects, persons, and/or scenes in the video data 200. The object detection circuitry 208 can implement one or more algorithms including, for example, artificial intelligence and machine learning to analyze the video data 200 and identify elements therein. Based on the analysis, the object detection circuitry 208 identifies specific objects, persons, and/or scenes in an image. For example, the object detection circuitry 208 can detect or identify one or more persons and/or parts of a person (e.g., a person's face) in a scene. Further, the object detection circuitry 208 can identify specific objects by name, category, shape, color, position, size, etc. in a scene. In addition, the object detection circuitry 208 can identify areas of a scene. For example, the object detection circuitry 208 can identify a foreground, a background, quadrants, two-dimensional coordinates, three-dimensional coordinates, etc. In some examples, the object detection circuitry 208 tracks the one or more object(s) and/or person(s). The object detection circuitry 208 can determine object and/or person coordinates and/or vector information when tracking. In some examples, the object detection circuitry 208 outputs and saves the details of the detection in the memory 220. The information may be used to, for example, identify and/or maintain focus on a region of interest, change a camera view, and/or otherwise to build context.

In the illustrated example, the marker generation circuitry 210 generates markers or labels based on the detected objects, persons, and scenes and overlays the markers on the scenes while being displayed on the display 108. The visual markers enable the user 102 to give verbal commands specific to the content of the scene. For example, the object detection circuitry 208 may detect a phone in the scene. In response, the marker generation circuitry 210 generates a marker, such as the text "phone," and overlays the marker on the scene near the phone. This enables the user 102 to issue a command such as "zoom on phone." Additionally or alternatively, the marker generator circuitry 212 can generate command markers, such as "zoom on phone," and overlays the command marker near the phone in the scene. Again, this provides visual ques to the user 102 as to what functions can be performed by the camera 114. In some examples, the visual markers are predefined and stored in the memory 220. In other examples, the visual markers are dynamically created, which may then also be stored in the memory 220. In some examples, the visual markers are coordinates and/or a grid of coordinates that enable a user to identify an area on which to focus.

In the illustrated example, the voice command detection circuitry 212 analyzes the audio data 202 to detect a camera voice command issued by the user 102 (or another person). Example camera voice commands can include "zoom in," "zoom out," "apply color correction," and/or other visual effects. In some examples, a camera voice command can include reference to a person, object, and/or scene as detected by the object detection circuitry 208. For example, assume the user 102 is performing a review of a new phone and is holding the phone in view of the camera 114. The user 102 can issue a camera voice command such as "zoom on phone" or "focus on phone." Other example voice commands can include "zoom on background," "zoom on foreground," "zoom on person," "focus on car," "focus on columns 5-6 and rows 10-15" (with reference to a grid), etc.

In some examples, the voice command detection circuitry 212 analyzes the most recent segments of the audio data 202 (e.g., the last 3 seconds) output by the microphone 116. If the voice command detection circuitry 212 detects a camera voice command in the audio data 202, the camera control circuitry 214 controls the camera 114 to perform the corresponding function. For example, if the voice command detection circuitry 212 detects the command "zoom on phone" in the audio data 202, the camera control circuitry 214 controls the camera 114 to zoom in on the phone. In some examples, a voice command is a phrase or sentence containing one or more keywords and/or a sequence of keywords. In some examples, one or more pre-determined voice commands are stored in the memory 220 along with the corresponding function. When the voice command detection circuitry 212 detects one of the voice commands, the camera control circuitry 214 controls the camera 114 to perform the corresponding function.

In some examples, the voice command detection circuitry 212 time stamps or labels the time segment in the video data 200 and audio data 202 corresponding to the detected voice command. In some examples, as disclosed in further detail herein, the audio and video editor circuitries 216, 218 remove, replace, and/or otherwise edit the video and audio data 200, 202 to remove the voice command. This may be achieved by removing, replacing, and/or muting data in the video and/or audio data 200, 202 occurring during the time segment when the voice command occurs. As such, the final recorded video does not include the audio of the voice command issued by the user 102. This produces a higher quality video (than could be achieved if the voice commands were included) while also saving the user significant editing time.

In some examples, the voice command detection circuitry 212 can detect and identify explicit commands and implicit commands. Explicit commands are direct commands for controlling the camera 114, such as "zoom on phone," "zoom on background," "zoom on foreground," "focus on phone," etc. These explicit commands are meant only for controlling the camera and are not considered part of the user's speech or conversation, which are intended for the audience of the video. Implicit commands, on the other hand, can be part of the user's speech or conversation intended for consumption by the audience. For example, while giving a review of a new phone, the user 102 may state "now let's take a closer look at the phone." While this phrase is intended to be heard by the audience, the voice command detection circuitry 212 also determines this phase includes an implicit command to zoom in on the phone. In such an instance, the camera control circuitry 214 controls the camera 114 to zoom in on the phone. In some examples, the voice command detection circuitry 212 implements or executes an artificial intelligence model to analyze the audio data 202 to detect and identify explicit and implicit commands.

In some examples, the audio editor circuitry 216 only edits the audio data 202 corresponding to explicit commands, but not implicit commands. This is because an implicit command is intended for the audience. Therefore, in some examples, if the voice command detection circuitry 212 identifies a voice command as an explicit command, the audio editor circuitry 216 may remove, replace, and/or otherwise edit the audio segment corresponding to the user's voice (as disclosed in further detail herein). However, if the voice command detection circuitry 212 identifies a voice command as an implicit command, the audio editor circuitry 216 of such examples does not edit the audio segment. This avoids inadvertently editing the user's speech or conversation that is intended as part of the video recording. Therefore, in some examples, the voice command detection circuitry 212 is to detect the voice command by determining whether the voice command is an explicit command or an implicit command. The voice command detection circuitry 212 does not edit the audio data 202 in response to determining the voice command is an implicit command.

Figures 3, 4, 5, 6:
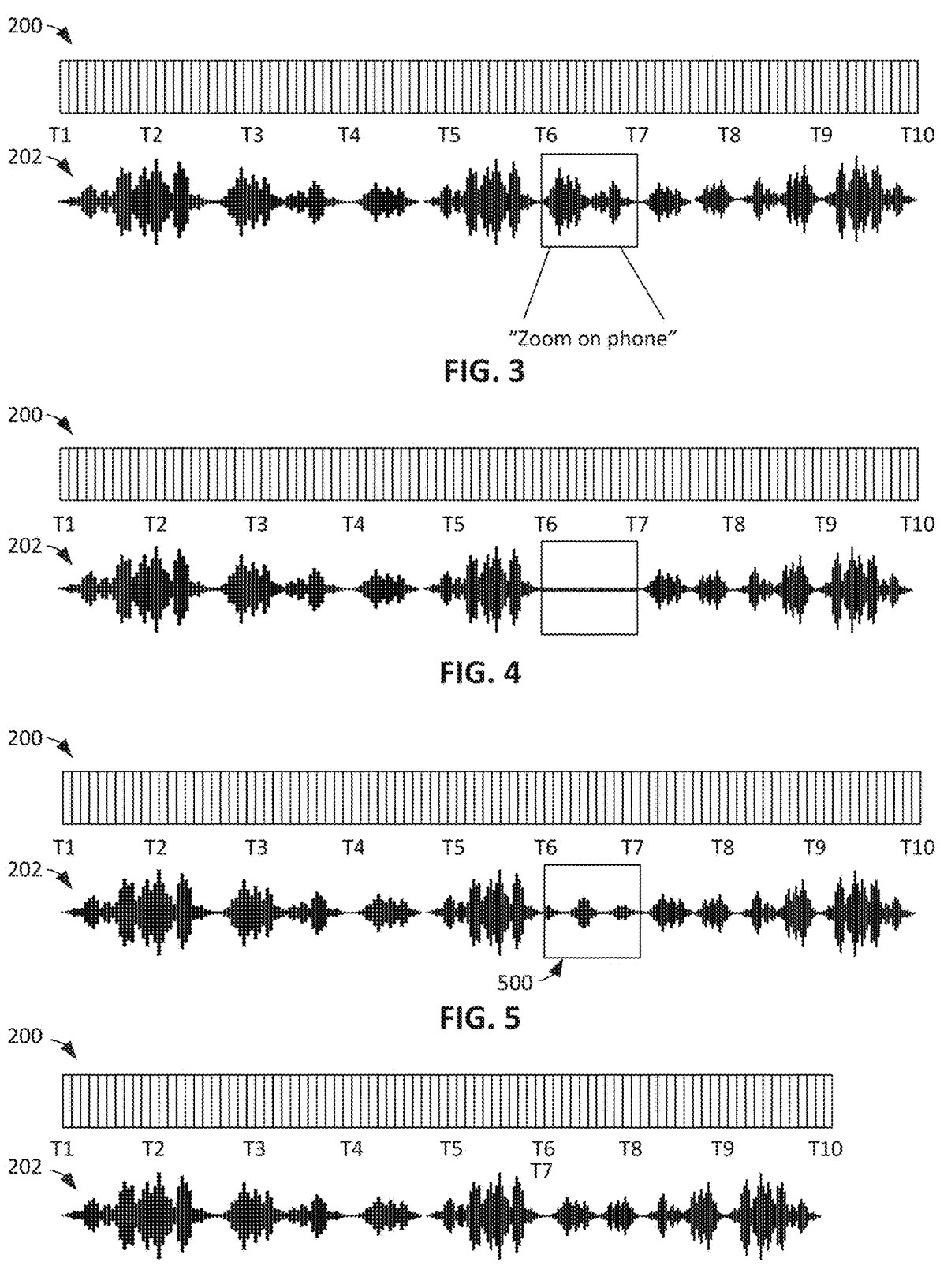
FIG. 3 is a time diagram of example video data and example audio data that can be edited by the example video editing system of FIG. 2.
FIG. 4 shows the time diagram of FIG. 3 in which data in a time segment of the example audio data corresponding to a voice command has been removed by the example video editing system of FIG. 2.
FIG. 5 shows the time diagram of FIG. 3 in which data in a time segment of the example audio data corresponding to a voice command has been replaced by another example audio clip by the example system of FIG. 2.
FIG. 6 shows the time diagram of FIG. 3 in which a time segment of the example video data and the example audio data corresponding to a voice command has been removed by the example video editing system of FIG. 2.

FIG. 3 shows an example portion of the video data 200 (images or frames) and the audio data 202 occurring between time T0 and time T10. Assume for example the user 102 is recording themselves giving a review of a new phone. The object detection circuitry 208 detects the phone in the scene. During the recording session, the user 102 says the command "zoom on phone" between times T6 and T7. The voice command detection circuitry 212 detects the camera voice command. In response, the camera control circuitry 214 controls the camera 114 to zoom in on the phone. The voice command detection circuitry 212 also time stamps or marks the time segment where the voice command starts (T6) and ends (T7). The voice command detection circuitry 212 can save the time stamps in the memory 220.

In response to detecting the voice command, the audio editor circuitry 216 edits the data in the audio data 202 occurring during the voice command (i.e., during the time segment between T6 and T7). In some examples, the audio editor circuitry 216 edits the data in the time segment by removing (e.g., dropping), concealing, or filtering (e.g., covering with background sound or otherwise masking) of the audio data. For example, as shown in FIG. 4, the audio editor circuitry 216 removes or reduces the audio data values to zero in the time segment between T6 and T7. This essentially mutes the audio occurring during the time segment between T6 and T7. As such, during this time segment of the video, little or no sound is output. In other examples, the audio editor circuitry 216 can filter (e.g., band pass the audio so the human voice bands are blocked) the voice out of the data while leaving the background sound/noise. Therefore, the auditor editor circuitry 216 can modify the audio data 202 corresponding to the voice command to at least one of remove or hide the voice command. In this example, the video data 200 remains unedited. The video generation circuitry 204 generates a video or video file including the video data 200 and the audio data 202 and saves it in the memory 220. In some examples, this is done without editing the video stream. As a result, when the new video is played, the audio data 202 does not contain the user 102 issuing the command "zoom on phone." This process may occur multiple times to remove the voice commands throughout the video.

In some examples, the audio editor circuitry 216 replaces a portion of the audio data 202 during the time segment with second audio data (also referred to as other data or another audio clip). For example, as shown in FIG. 5, the audio editor circuitry 216 has replaced the data in the time segment with a new audio clip 500. In some examples, the audio clip 500 includes noise and/or background sound from another segment of the audio data 202. For example, assume the sound of cars is heard in the background during other segments of the audio data 202. The audio editor circuitry 216 can extract and save (in the memory 220) one or more segments of the background sounds from the audio data 202. The audio editor circuitry 216 uses the saved background sound as the audio clip 500. In another example, the audio clip 500 is from another audio file. For example, the audio editor circuitry 216 may obtain an audio clip from another video recorded by the user 102 (e.g., background sounds from another pre-recorded video) or other contextually relevant synthesized audio and insert it into the audio data 202 during the time segment. The video generation circuitry 204 generates a video and/or video file including the video data 200 and the audio data 202 and saves it in the memory 220. This process may occur multiple times to remove the voice commands in throughout the video.

In some examples, the time segment of the video data 200 and the audio data 202 corresponding to the voice command are both completely removed. In other words, the video editing system 120 removes respective portions of the video data 200 and the audio data 202 corresponding to the time segment the voice command occurred. As such, the entire video file is shortened. For example, FIG. 6 shows an example in which the video editor circuitry 218 completely removed the video frames occurring in the time segment corresponding to the voice command and the audio editor circuitry 216 completely removed the audio occurring in the time segment corresponding to the voice command. As such, the video file does not include the A/V data which occurring during the segment corresponding to the voice command. The video generation circuitry 204 generates a video or video file including the video data 200 and the audio data 202 without the A/V data from the omitted time frame and saves it in the memory 220. As a result, when the new video is played, the video file does not include the portion or segment where the voice command is issued. Instead, the video effectively skips to the next scene after the voice command. This process may occur multiple times to remove the voice commands throughout the video.

In some examples, the system 120 determines whether to edit just the audio data 202 (as shown in FIGS. 4 and 5), or edit both the video data 200 and the audio data 202 (as shown in FIG. 6), based on whether the user's face is in the video data 200 during the time of the voice command. For example, the object detection circuitry 208 determines whether a face of a person appears in the video data 200 during the time segment of the voice command (between T6 and T7). If the object detection circuitry 208 detects a face in the video data 200 during the voice command (between T6 and T7), then the audio and video editor circuitry 216, 218 remove the video and audio data 200, 202 of the corresponding time segment(s) (as shown in FIG. 6), such that the entire video is shortened (e.g., does not include the time segment between T6 and T7). In other words, the segment of the video where the user 102 issues the voice command is removed or otherwise omitted. This segment is not important for the content intended for the audience. Further, if the video data 200 were retained, it may be confusing to the audience since the user's face can be seen as talking but no audio is heard. Therefore, it is advantageous to remove such segment(s) of the video corresponding to the voice command. In other examples, this determination may be based on whether another part of the body of the user 102 or any person is present in the video.

However, if the object detection circuitry 208 does not detect a person's face (e.g., a face of the user 102) in the video frames correspond to the voice command (between T6 and T7), then the audio editor circuitry 216 may delete or replace the audio occurring during the voice command, but the video data 200 is not changed (e.g., the video stream remains the same such as shown in FIGS. 4 and 5). For example, assume the user 102 is not in view of the camera 114 (e.g., standing behind the camera), but verbally issues a voice command. The audio editor circuitry 216 can remove or replace the audio data occurring during the voice command without changing the video data 200 because the user's face is not in the video and there is no risk of the audience seeing a mouth speaking without accompanying audio. However, in other examples, even if the user 102 is off camera, the video editor circuitry 218 and the audio editor circuitry 216 may still completely remove video frame(s) occurring during the time segment corresponding to the voice command (as shown in FIG. 6).

In some examples, when the video editor circuitry 218 is to remove video data 200 corresponding to the voice command, the video editor circuitry 218 performs a smoothing operation to blend the frames before and after the voice command to maintain smoothness and frame rate in the video data 200. For example, the video editor circuitry 218 may remove additional frames before or after the voice command so that the transition appears less abrupt in the final video. In some examples, the video editor circuitry 218 implements or executes a machine learning model to determine which frames to skip to improve the smoothness and maintain a certain frame rate in the final video presentation.

In some examples, the system 120 is configured to only remove voice commands that are intent-based phrases or sentences that include one or more keywords or a sequence of keywords recognized as camera controls. This prevents the system 120 from inadvertently removing words from the user's speech as seen in keyword removal applications. For example, a camera voice command may include "zoom on mobile phone." When the system 120 detects this phrase, the system 120 recognizes the phrase is a voice command and removes the phrase from the audio data. On the other hand, if the user states "this phone has a unique zoom feature," the system 120 would not remove the word "zoom" from the system, as may occur in keyword removal based systems. This may be accomplished by using camera control responses as a verification mechanism. For example, only phrases that result in a change to the operation, function, setting, and/or state of the camera result in editing the audio and/or video.

While the examples disclosed above are described in connection with voice commands for controlling a camera, the example system 120 can similarly detect and edit voice commands intended for other types of devices. For example, the user 102 may be able to issue verbal commands for switching between multiple cameras, switching on and off a light, controlling background sound or music, activating a fog machine, and/or controlling any other type of device(s). The example system 120 can similarly recognize these voice commands and determine whether to edit out the voice commands from the audio and/or video data.

As disclosed herein, in some examples, artificial intelligence or machine learning can be implemented to perform one or more functions. Artificial intelligence (AI), including machine learning (ML), deep learning (DL), and/or other artificial machine-driven logic, enable machines (e.g., computers, logic circuits, etc.) to use a model to process input data to generate an output based on patterns and/or associations previously learned by the model via a training process. For instance, the model may be trained with data to recognize patterns and/or associations and follow such patterns and/or associations when processing input data such that other input(s) result in output(s) consistent with the recognized patterns and/or associations.

In general, implementing a ML/AI system involves two phases, a learning/training phase and an inference phase. In the learning/training phase, a training algorithm is used to train a model to operate in accordance with patterns and/or associations based on, for example, training data. In general, the model includes internal parameters that guide how input data is transformed into output data, such as through a series of nodes and connections within the model to transform input data into output data. Additionally, hyperparameters are used as part of the training process to control how the learning is performed (e.g., a learning rate, a number of layers to be used in the machine learning model, etc.). Hyperparameters are defined to be training parameters that are determined prior to initiating the training process.

Different types of training may be performed based on the type of ML/AI model and/or the expected output. For example, supervised training uses inputs and corresponding expected (e.g., labeled) outputs to select parameters (e.g., by iterating over combinations of select parameters) for the ML/AI model that reduce model error. As used herein, labelling refers to an expected output of the machine learning model (e.g., a classification, an expected output value, etc.). Alternatively, unsupervised training (e.g., used in deep learning, a subset of machine learning, etc.) involves inferring patterns from inputs to select parameters for the ML/AI model (e.g., without the benefit of expected (e.g., labeled) outputs).

In examples disclosed herein, ML/AI models are trained using stochastic gradient descent. However, any other training algorithm may additionally or alternatively be used. In examples disclosed herein, training is performed until an acceptable amount of error is achieved. In examples disclosed herein, training can be performed locally or at a remote device. Training is performed using hyperparameters that control how the learning is performed (e.g., a learning rate, a number of layers to be used in the machine learning model, etc.). In some examples re-training may be performed.

Training is performed using training data. In some examples disclosed herein, the training data originates from locally generated data. Because supervised training is used, the training data is labeled.

Once training is complete, the model is deployed for use as an executable construct that processes an input and provides an output based on the network of nodes and connections defined in the model. The model is stored at memory 220. The model may then be executed by one or more of the circuitry 204-218.

Once trained, the deployed model may be operated in an inference phase to process data. In the inference phase, data to be analyzed (e.g., live data) is input to the model, and the model executes to create an output. This inference phase can be thought of as the AI "thinking" to generate the output based on what it learned from the training (e.g., by executing the model to apply the learned patterns and/or associations to the live data). In some examples, input data undergoes pre-processing before being used as an input to the machine learning model. Moreover, in some examples, the output data may undergo post-processing after it is generated by the AI model to transform the output into a useful result (e.g., a display of data, an instruction to be executed by a machine, etc.).

In some examples, output of the deployed model may be captured and provided as feedback. By analyzing the feedback, an accuracy of the deployed model can be determined. If the feedback indicates that the accuracy of the deployed model is less than a threshold or other criterion, training of an updated model can be triggered using the feedback and an updated training data set, hyperparameters, etc., to generate an updated, deployed model.

While an example manner of implementing the system of FIG. 1 is illustrated in FIG. 2, one or more of the elements, processes, and/or devices illustrated in FIG. 2 may be combined, divided, re-arranged, omitted, eliminated, and/or implemented in any other way. Further, the example video generation circuitry 204, the example display circuitry 206, the example object detection circuitry 208, the example marker generation circuitry 210, the example voice command detection circuitry 212, the example camera control circuitry 214, the example audio editor circuitry 216, the example video editor circuitry 218, and/or, more generally, the example system 120 of FIG. 1, may be implemented by hardware alone or by hardware in combination with software and/or firmware. Thus, for example, any of the example video generation circuitry 204, the example display circuitry 206, the example object detection circuitry 208, the example marker generation circuitry 210, the example voice command detection circuitry 212, the example camera control circuitry 214, the example audio editor circuitry 216, the example video editor circuitry 218, and/or, more generally, the example system 120, could be implemented by processor circuitry, analog circuit(s), digital circuit(s), logic circuit(s), programmable processor(s), programmable microcontroller (s), graphics processing unit(s) (GPU(s)), digital signal processor(s) (DSP(s)), application specific integrated circuit (s) (ASIC(s)), programmable logic device(s) (PLD(s)), and/ or field programmable logic device(s) (FPLD(s)) such as Field Programmable Gate Arrays (FPGAs). Further still, the example system 120 of FIG. 1 may include one or more elements, processes, and/or devices in addition to, or instead of, those illustrated in FIG. 2, and/or may include more than one of any or all of the illustrated elements, processes and devices.

Figure 7:
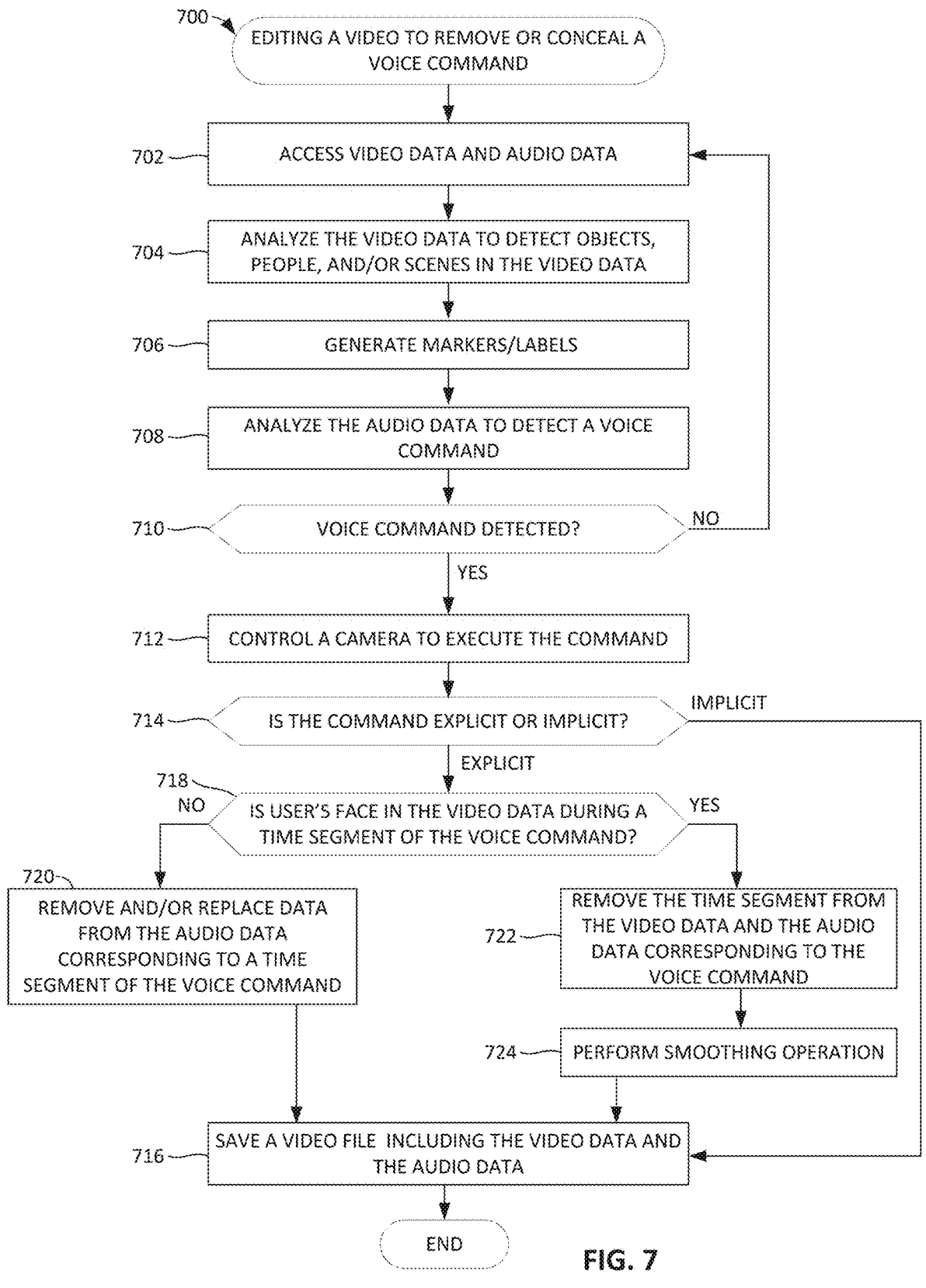
FIG. 7 is a flowchart representative of example machine readable instructions and/or example operations that may be executed and/or instantiated by example processor circuitry to implement the example video editing system of FIG. 2.

A flowchart representative of example machine readable instructions, which may be executed to configure processor circuitry to implement the system 120 of FIG. 2, is shown in FIG. 7. The machine readable instructions may be one or more executable programs or portion(s) of an executable program for execution by processor circuitry, such as the processor circuitry 812 shown in the example processor platform 800 discussed below in connection with FIG. 8 and/or the example processor circuitry discussed below in connection with FIGS. 9 and/or 10. The program may be embodied in software stored on one or more non-transitory computer readable storage media such as a compact disk (CD), a floppy disk, a hard disk drive (HDD), a solid-state drive (SSD), a digital versatile disk (DVD), a Blu-ray disk, a volatile memory (e.g., Random Access Memory (RAM) of any type, etc.), or a non-volatile memory (e.g., electrically erasable programmable read-only memory (EEPROM), FLASH memory, an HDD, an SSD, etc.) associated with processor circuitry located in one or more hardware devices, but the entire program and/or parts thereof could alternatively be executed by one or more hardware devices other than the processor circuitry and/or embodied in firmware or dedicated hardware. The machine readable instructions may be distributed across multiple hardware devices and/or executed by two or more hardware devices (e.g., a server and a client hardware device). For example, the client hardware device may be implemented by an endpoint client hardware device (e.g., a hardware device associated with a user) or an intermediate client hardware device (e.g., a radio access network (RAN)) gateway that may facilitate communication between a server and an endpoint client hardware device). Similarly, the non-transitory computer readable storage media may include one or more mediums located in one or more hardware devices. Further, although the example program is described with reference to the flowchart illustrated in FIG. 7, many other methods of implementing the example system 120 may alternatively be used. For example, the order of execution of the blocks may be changed, and/or some of the blocks described may be changed, eliminated, or combined. Additionally or alternatively, any or all of the blocks may be implemented by one or more hardware circuits (e.g., processor circuitry, discrete and/or integrated analog and/or digital circuitry, an FPGA, an ASIC, a comparator, an operational-amplifier (op-amp), a logic circuit, etc.) structured to perform the corresponding operation without executing software or firmware. The processor circuitry may be distributed in different network locations and/or local to one or more hardware devices (e.g., a single-core processor (e.g., a single core central processor unit (CPU)), a multi-core processor (e.g., a multi-core CPU, an XPU, etc.) in a single machine, multiple processors distributed across multiple servers of a server rack, multiple processors distributed across one or more server racks, a CPU and/or a FPGA located in the same package (e.g., the same integrated circuit (IC) package or in two or more separate housings, etc.).

The machine readable instructions described herein may be stored in one or more of a compressed format, an encrypted format, a fragmented format, a compiled format, an executable format, a packaged format, etc. Machine readable instructions as described herein may be stored as data or a data structure (e.g., as portions of instructions, code, representations of code, etc.) that may be utilized to create, manufacture, and/or produce machine executable instructions. For example, the machine readable instructions may be fragmented and stored on one or more storage devices and/or computing devices (e.g., servers) located at the same or different locations of a network or collection of networks (e.g., in the cloud, in edge devices, etc.). The machine readable instructions may require one or more of installation, modification, adaptation, updating, combining, supplementing, configuring, decryption, decompression, unpacking, distribution, reassignment, compilation, etc., in order to make them directly readable, interpretable, and/or executable by a computing device and/or other machine. For example, the machine readable instructions may be stored in multiple parts, which are individually compressed, encrypted, and/or stored on separate computing devices, wherein the parts when decrypted, decompressed, and/or combined form a set of machine executable instructions that implement one or more operations that may together form a program such as that described herein.

In another example, the machine readable instructions may be stored in a state in which they may be read by processor circuitry, but require addition of a library (e.g., a dynamic link library (DLL)), a software development kit (SDK), an application programming interface (API), etc., in order to execute the machine readable instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, machine readable media, as used herein, may include machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), Structured Query Language (SQL), Swift, etc.

As mentioned above, the example operations of FIG. 7 may be implemented using executable instructions (e.g., computer and/or machine readable instructions) stored on one or more non-transitory computer and/or machine readable media such as optical storage devices, magnetic storage devices, an HDD, a flash memory, a read-only memory (ROM), a CD, a DVD, a cache, a RAM of any type, a register, and/or any other storage device or storage disk in which information is stored for any duration (e.g., for extended time periods, permanently, for brief instances, for temporarily buffering, and/or for caching of the information). As used herein, the terms non-transitory computer readable medium, non-transitory computer readable storage medium, non-transitory machine readable medium, and non-transitory machine readable storage medium are expressly defined to include any type of computer readable storage device and/or storage disk and to exclude propagating signals and to exclude transmission media. As used herein, the terms "computer readable storage device" and "machine readable storage device" are defined to include any physical (mechanical and/or electrical) structure to store information, but to exclude propagating signals and to exclude transmission media. Examples of computer readable storage devices and machine readable storage devices include random access memory of any type, read only memory of any type, solid state memory, flash memory, optical discs, magnetic disks, disk drives, and/or redundant array of independent disks (RAID) systems. As used herein, the term "device" refers to physical structure such as mechanical and/or electrical equipment, hardware, and/or circuitry that may or may not be configured by computer readable instructions, machine readable instructions, etc., and/or manufactured to execute computer readable instructions, machine readable instructions, etc.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc., may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, or (7) A with B and with C. As used herein in the context of describing structures, components, items, objects and/or things, the phrase "at least one of A and B" is intended to refer to implementations including any of (1) at least one A, (2) at least one B, or (3) at least one A and at least one B. Similarly, as used herein in the context of describing structures, components, items, objects and/or things, the phrase "at least one of A or B" is intended to refer to implementations including any of (1) at least one A, (2) at least one B, or (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, or (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, or (3) at least one A and at least one B.

As used herein, singular references (e.g., "a", "an", "first", "second", etc.) do not exclude a plurality. The term "a" or "an" object, as used herein, refers to one or more of that object. The terms "a" (or "an"), "one or more", and "at least one" are used interchangeably herein. Furthermore, although individually listed, a plurality of means, elements or method actions may be implemented by, e.g., the same entity or object. Additionally, although individual features may be included in different examples or claims, these may possibly be combined, and the inclusion in different examples or claims does not imply that a combination of features is not feasible and/or advantageous.

FIG. 7 is a flowchart representative of example machine readable instructions and/or example operations 700 that may be executed and/or instantiated by processor circuitry to edit a video to remove or conceal a voice command. The machine readable instructions and/or the operations 700 of FIG. 7 begin at block 702, at which the system 120 accesses the video data 200 and the audio data 202 from a session being recorded. The video data 200 is output by the camera 114, and the audio data 202 is output by the microphone 116 (and, thus, is associated with the video data 200 output by the camera 114). In some examples, the system 120 receives live video and audio feed from the camera 114 and the microphone 116. In some examples, the display circuitry 206 causes the display 108 to present or display the video data 200 (the live video feed) from the camera 114 as feedback to the user 102. Additionally or alternatively, the system 120 can access the video data 200 and the audio data 202 from a pre-recorded video file that has been stored in the memory 220 or another location.

At block 704, the object detection circuitry 208 analyzes the video data 200 to detect objects, persons, and/or scenes in the video data 200. In some examples, the object detection circuitry 208 implements one or more algorithms including, for example, artificial intelligence and machine learning to analyze the video data 200. At block 706, the marker generation circuitry 210 generates markers or labels based on the detected object(s), person(s), and/or scene(s). In some examples, the marker generation circuitry 210 displays the markers as overlaid on the video being displayed on the display 108 to the user 102.

At block 708, the voice command detection circuitry 212 analyzes the audio data 202 to detect a voice command, such as a camera voice command. The voice command is intended to control at least one of a function, an operation, a setting, or a state of a controllable device, such as a camera. In some examples, the voice command detection circuitry 212 executes an artificial intelligence model to detect a voice command in the audio data 202. The voice command detection circuitry 212 can detect and identify explicit and implicit commands. At block 710, the voice command detection circuitry 212 determines if a camera voice command has been detected. If a camera voice command has not been detected, control proceeds back to block 702 and the example operations are repeated. In some examples, the voice command detection circuitry 212 analyzes the audio data 202 in real time or substantially real time as the audio data 202 is output by the microphone 116. Therefore, in some examples, these operations are repeated at a certain frequency or period as new audio data is received. Additionally or alternately, these operations can be performed on a pre-recorded video.

If the voice command detection circuitry 212 detects a voice command, the camera control circuitry 214, at block 712, controls the camera 114 to execute the corresponding command (e.g., zoom in, zoom out, focus on an object, focus on a person, etc.). In some examples the camera control circuitry 214 references a look-up table or directory of commands saved in the memory 220.

At block 714, the voice command detection circuitry 212 determines whether the command is an explicit command or an implicit command. If the voice command detection circuitry 212 determines the camera voice command is an implicit command, the system 120 does not edit the video or audio data 200, 202. As disclosed above, this is because implicit commands are typically considered part of the user's speech or conversation and, thus, should be left in the video. At block 716, the video generation circuitry 204 formats the video data 200 and the audio data 202 as a video file and saves the video file in the memory 220 or another location. In some examples, the system 120 analyzes and saves the incoming video and audio data 200, 202 as part of the video file. The example operations of FIG. 7 can be repeated continuously as new video and audio data is received.

If the voice command detection circuitry 212 determines the camera voice command is an explicit command, the system 120 edits or modifies at least the audio data 202 to remove the camera voice command. At block 718, the object detection circuitry 208 determines whether a face of a person (e.g., the user) is present in the video data 200 during the time segment (e.g., between T6 and T7 in FIG. 3) of the audio data 202 corresponding to the voice command.

If a person's face is not present in the video data 200 during the time segment corresponding to the camera voice command, the video editor circuitry 218, at block 720, removes and/or replaces the data from the audio data 202 corresponding to the time segment of the camera voice command. In some examples, such as shown in FIG. 4, the audio editor circuitry 216 reduces or filters the data occurring during the time segment, such that little or no sound is heard during that time segment when the video is played and, thus, removes the camera voice command from the audio data 202. In other examples, such as shown in FIG. 5, the audio editor circuitry 216 replaces the data occurring during the time segment with another audio clip, such as background sound from another segment of the video. At block 716, the video generation circuitry 204 saves a file (e.g., a video file or A/V file) including the video data 200 and the audio data 202.

If a person's face is present in the video data 200 during the time segment corresponding to the camera voice command, at block 722, the audio and video editor circuitries 216, 218 remove or delete the time segment of the video and audio data 200, 202 corresponding to the time segment of the camera voice command, such as shown in FIG. 6. This shortens the length of the overall video by removing the segment of the video corresponding to the voice command. In some examples, at block 724, the audio and video editor circuitries 216, 218 performs a smoothing operation to help transition between the frames/audio occurring before the voice command and the frames/audio occurring after the voice command. In some examples, the audio and video editor circuitries 216, 218 can implement or execute a machine learning model to perform the smoothing operation. At block 716, the video generation circuitry 204 generates and saves the video data 200 and the audio data 202 as a video file. The video file can be transmitted to and/or otherwise accessed by one or more persons. For example, the user 102 may upload the video file to YouTube® or Facebook® to be viewed by an audience.

Figure 8:
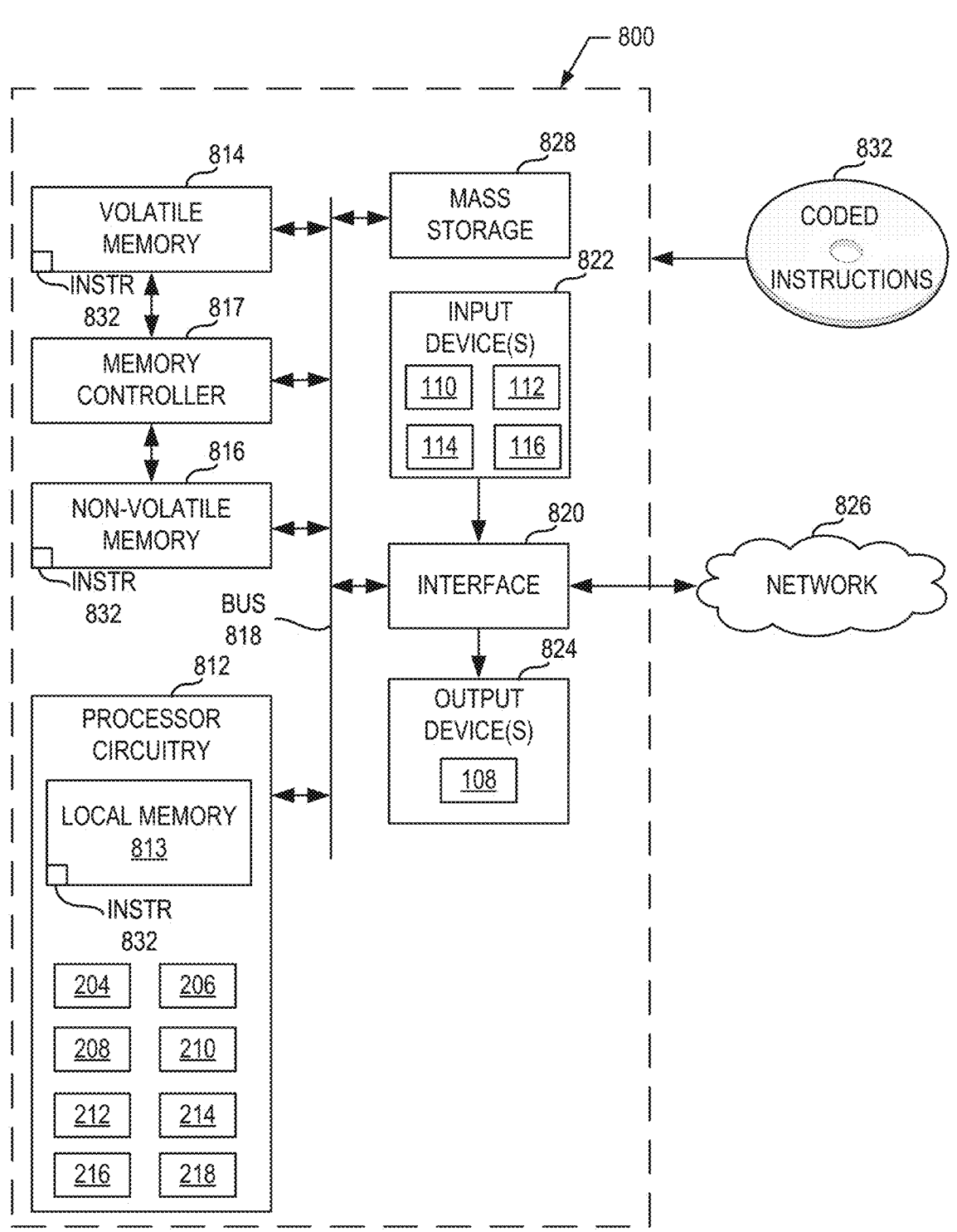
FIG. 8 is a block diagram of an example processing platform including processor circuitry structured to execute the example machine readable instructions and/or the example operations of FIG. 7 to implement the example video editing system of FIG. 2.

FIG. 8 is a block diagram of an example processor platform 800 structured to execute and/or instantiate the machine readable instructions and/or the operations of FIG. 7 to implement the system 120 of FIG. 2. The processor platform 800 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a headset (e.g., an augmented reality (AR) headset, a virtual reality (VR) headset, etc.) or other wearable device, or any other type of computing device.

The processor platform 800 of the illustrated example includes processor circuitry 812. The processor circuitry 812 of the illustrated example is hardware. For example, the processor circuitry 812 can be implemented by one or more integrated circuits, logic circuits, FPGAs, microprocessors, CPUs, GPUs, DSPs, and/or microcontrollers from any desired family or manufacturer. The processor circuitry 812 may be implemented by one or more semiconductor based (e.g., silicon based) devices. In this example, the processor circuitry 812 implements the example video generation circuitry 204, the example display circuitry 206, the example object detection circuitry 208, the example marker generation circuitry 210, the example voice command detection circuitry 212, the example camera control circuitry 214, the example audio editor circuitry 216, and the example video editor circuitry 218.

The processor circuitry 812 of the illustrated example includes a local memory 813 (e.g., a cache, registers, etc.). The processor circuitry 812 of the illustrated example is in communication with a main memory including a volatile memory 814 and a non-volatile memory 816 by a bus 818. The volatile memory 814 may be implemented by Synchronous Dynamic Random Access Memory (SDRAM), Dynamic Random Access Memory (DRAM), RAMBUS® Dynamic Random Access Memory (RDRAM®), and/or any other type of RAM device. The non-volatile memory 816 may be implemented by flash memory and/or any other desired type of memory device. Access to the main memory 814, 816 of the illustrated example is controlled by a memory controller 817.

The processor platform 800 of the illustrated example also includes interface circuitry 820. The interface circuitry 820 may be implemented by hardware in accordance with any type of interface standard, such as an Ethernet interface, a universal serial bus (USB) interface, a Bluetooth® interface, a near field communication (NFC) interface, a Peripheral Component Interconnect (PCI) interface, and/or a Peripheral Component Interconnect Express (PCIe) interface.

In the illustrated example, one or more input devices 822 are connected to the interface circuitry 820. The input device(s) 822 permit(s) a user to enter data and/or commands into the processor circuitry 812. The input device(s) 822 can be implemented by, for example, an audio sensor, a microphone (e.g., the microphone 116), a camera (still or video) (e.g., the camera 114), a keyboard (e.g., the keyboard 110), a button, a mouse (e.g., the mouse 112), a touchscreen (e.g., the display 108), a track-pad, a trackball, an isopoint device, and/or a voice recognition system.

One or more output devices 824 are also connected to the interface circuitry 820 of the illustrated example. The output device(s) 824 can be implemented, for example, by display devices (e.g., the display 108) (e.g., a light emitting diode (LED), an organic light emitting diode (OLED), a liquid crystal display (LCD), a cathode ray tube (CRT) display, an in-place switching (IPS) display, a touchscreen, etc.), a tactile output device, a printer, and/or speaker. The interface circuitry 820 of the illustrated example, thus, typically includes a graphics driver card, a graphics driver chip, and/or graphics processor circuitry such as a GPU.

The interface circuitry 820 of the illustrated example also includes a communication device such as a transmitter, a receiver, a transceiver, a modem, a residential gateway, a wireless access point, and/or a network interface to facilitate exchange of data with external machines (e.g., computing devices of any kind) by a network 826. The communication can be by, for example, an Ethernet connection, a digital subscriber line (DSL) connection, a telephone line connection, a coaxial cable system, a satellite system, a line-of-site wireless system, a cellular telephone system, an optical connection, etc.

The processor platform 800 of the illustrated example also includes one or more mass storage devices 828 to store software and/or data. Examples of such mass storage devices 828 include magnetic storage devices, optical storage devices, floppy disk drives, HDDs, CDs, Blu-ray disk drives, redundant array of independent disks (RAID) systems, solid state storage devices such as flash memory devices and/or SSDs, and DVD drives.

The machine readable instructions 832, which may be implemented by the machine readable instructions of FIG. 7, may be stored in the mass storage device 828, in the volatile memory 814, in the non-volatile memory 816, and/or on a removable non-transitory computer readable storage medium such as a CD or DVD. The memory 220 can be implemented as any of the mass storage devices 828, the volatile memory 814, and/or the non-volatile memory 816.

Figure 9:
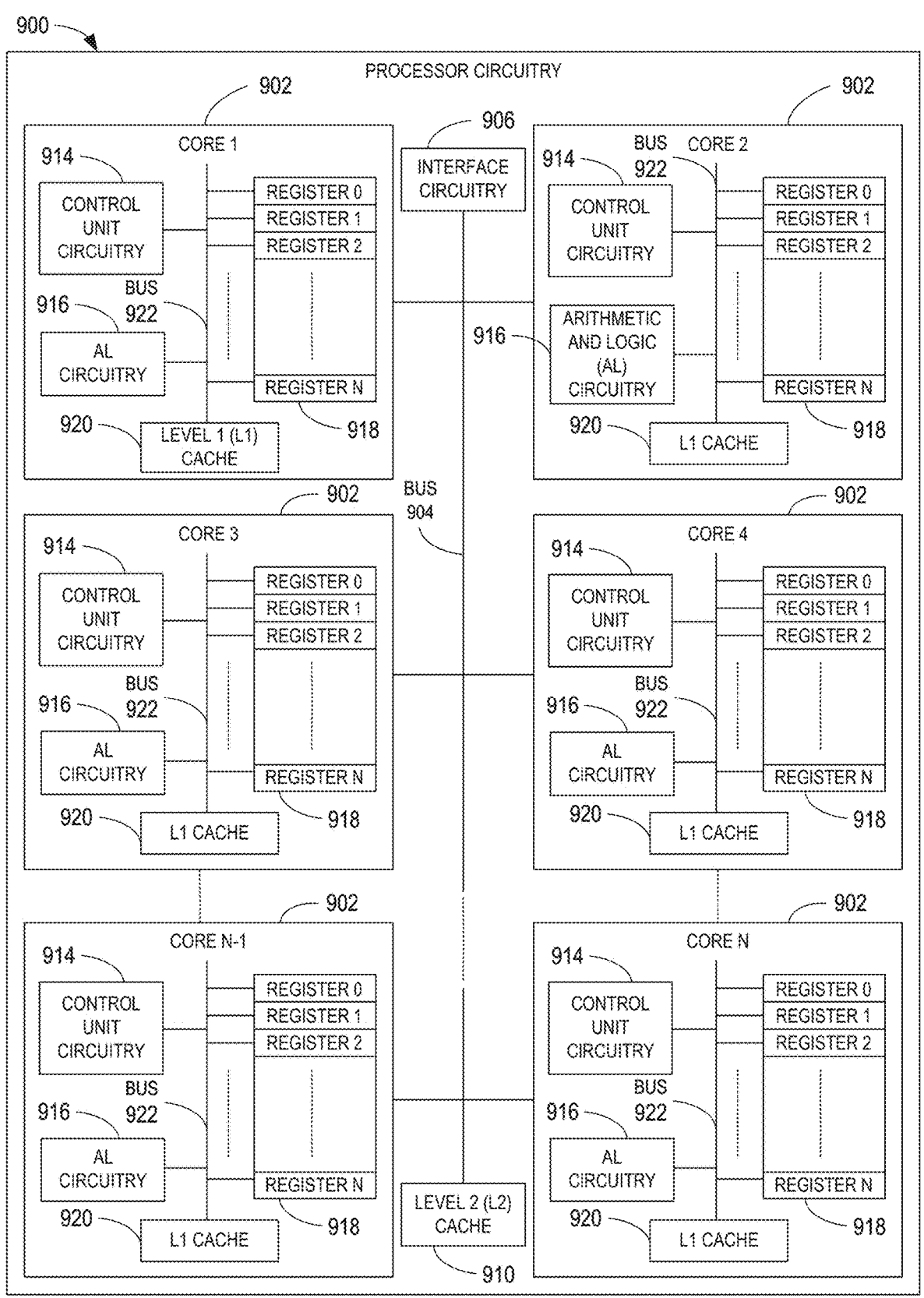
FIG. 9 is a block diagram of an example implementation of the processor circuitry of FIG. 8.

FIG. 9 is a block diagram of an example implementation of the processor circuitry 812 of FIG. 8. In this example, the processor circuitry 812 of FIG. 8 is implemented by a microprocessor 900. For example, the microprocessor 900 may be a general purpose microprocessor (e.g., general purpose microprocessor circuitry). The microprocessor 900 executes some or all of the machine readable instructions of the flowchart of FIG. 7 to effectively instantiate the circuitry of FIG. 2 as logic circuits to perform the operations corresponding to those machine readable instructions. In some such examples, the circuitry of FIG. 2 is instantiated by the hardware circuits of the microprocessor 900 in combination with the instructions. For example, the microprocessor 900 may be implemented by multi-core hardware circuitry such as a CPU, a DSP, a GPU, an XPU, etc. Although it may include any number of example cores 902 (e.g., 1 core), the microprocessor 900 of this example is a multi-core semiconductor device including N cores. The cores 902 of the microprocessor 900 may operate independently or may cooperate to execute machine readable instructions. For example, machine code corresponding to a firmware program, an embedded software program, or a software program may be executed by one of the cores 902 or may be executed by multiple ones of the cores 902 at the same or different times. In some examples, the machine code corresponding to the firmware program, the embedded software program, or the software program is split into threads and executed in parallel by two or more of the cores 902. The software program may correspond to a portion or all of the machine readable instructions and/or operations represented by the flowchart of FIG. 7.

The cores 902 may communicate by a first example bus 904. In some examples, the first bus 904 may be implemented by a communication bus to effectuate communication associated with one(s) of the cores 902. For example, the first bus 904 may be implemented by at least one of an Inter-Integrated Circuit (I2C) bus, a Serial Peripheral Interface (SPI) bus, a PCI bus, or a PCIe bus. Additionally or alternatively, the first bus 904 may be implemented by any other type of computing or electrical bus. The cores 902 may obtain data, instructions, and/or signals from one or more external devices by example interface circuitry 906. The cores 902 may output data, instructions, and/or signals to the one or more external devices by the interface circuitry 906. Although the cores 902 of this example include example local memory 920 (e.g., Level 1 (L1) cache that may be split into an L1 data cache and an L1 instruction cache), the microprocessor 900 also includes example shared memory 910 that may be shared by the cores (e.g., Level 2 (L2 cache)) for high-speed access to data and/or instructions. Data and/or instructions may be transferred (e.g., shared) by writing to and/or reading from the shared memory 910. The local memory 920 of each of the cores 902 and the shared memory 910 may be part of a hierarchy of storage devices including multiple levels of cache memory and the main memory (e.g., the main memory 814, 816 of FIG. 8). Typically, higher levels of memory in the hierarchy exhibit lower access time and have smaller storage capacity than lower levels of memory. Changes in the various levels of the cache hierarchy are managed (e.g., coordinated) by a cache coherency policy.

Each core 902 may be referred to as a CPU, DSP, GPU, etc., or any other type of hardware circuitry. Each core 902 includes control unit circuitry 914, arithmetic and logic (AL) circuitry (sometimes referred to as an ALU) 916, a plurality of registers 918, the local memory 920, and a second example bus 922. Other structures may be present. For example, each core 902 may include vector unit circuitry, single instruction multiple data (SIMD) unit circuitry, load/store unit (LSU) circuitry, branch/jump unit circuitry, floating-point unit (FPU) circuitry, etc. The control unit circuitry 914 includes semiconductor-based circuits structured to control (e.g., coordinate) data movement within the corresponding core 902. The AL circuitry 916 includes semiconductor-based circuits structured to perform one or more mathematic and/or logic operations on the data within the corresponding core 902. The AL circuitry 916 of some examples performs integer based operations. In other examples, the AL circuitry 916 also performs floating point operations. In yet other examples, the AL circuitry 916 may include first AL circuitry that performs integer based operations and second AL circuitry that performs floating point operations. In some examples, the AL circuitry 916 may be referred to as an Arithmetic Logic Unit (ALU). The registers 918 are semiconductor-based structures to store data and/or instructions such as results of one or more of the operations performed by the AL circuitry 916 of the corresponding core 902. For example, the registers 918 may include vector register(s), SIMD register(s), general purpose register(s), flag register(s), segment register(s), machine specific register(s), instruction pointer register(s), control register(s), debug register(s), memory management register(s), machine check register(s), etc. The registers 918 may be arranged in a bank as shown in FIG. 9. Alternatively, the registers 918 may be organized in any other arrangement, format, or structure including distributed throughout the core 902 to shorten access time. The second bus 922 may be implemented by at least one of an I2C bus, a SPI bus, a PCI bus, or a PCIe bus Each core 902 and/or, more generally, the microprocessor 900 may include additional and/or alternate structures to those shown and described above. For example, one or more clock circuits, one or more power supplies, one or more power gates, one or more cache home agents (CHAs), one or more converged/common mesh stops (CMSs), one or more shifters (e.g., barrel shifter(s)) and/or other circuitry may be present. The microprocessor 900 is a semiconductor device fabricated to include many transistors interconnected to implement the structures described above in one or more integrated circuits (ICs) contained in one or more packages. The processor circuitry may include and/or cooperate with one or more accelerators. In some examples, accelerators are implemented by logic circuitry to perform certain tasks more quickly and/or efficiently than can be done by a general purpose processor. Examples of accelerators include ASICs and FPGAs such as those discussed herein. A GPU or other programmable device can also be an accelerator. Accelerators may be on-board the processor circuitry, in the same chip package as the processor circuitry and/or in one or more separate packages from the processor circuitry.

Figure 10:
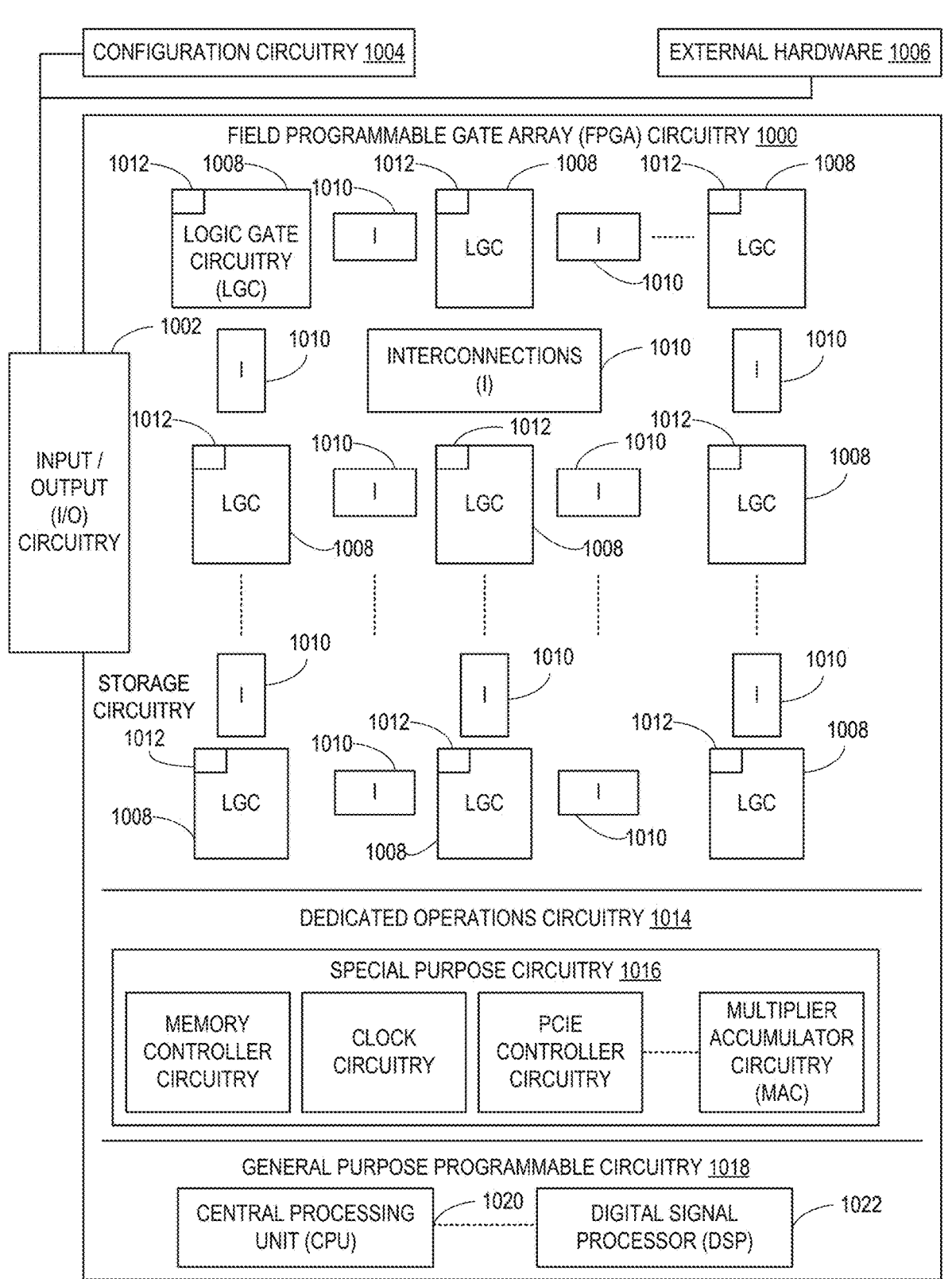
FIG. 10 is a block diagram of another example implementation of the processor circuitry of FIG. 8.

FIG. 10 is a block diagram of another example implementation of the processor circuitry 812 of FIG. 8. In this example, the processor circuitry 812 is implemented by FPGA circuitry 1000. For example, the FPGA circuitry 1000 may be implemented by an FPGA. The FPGA circuitry 1000 can be used, for example, to perform operations that could otherwise be performed by the example microprocessor 900 of FIG. 9 executing corresponding machine readable instructions. However, once configured, the FPGA circuitry 1000 instantiates the machine readable instructions in hardware and, thus, can often execute the operations faster than they could be performed by a general purpose microprocessor executing the corresponding software.

More specifically, in contrast to the microprocessor 900 of FIG. 9 described above (which is a general purpose device that may be programmed to execute some or all of the machine readable instructions represented by the flowchart of FIG. 7 but whose interconnections and logic circuitry are fixed once fabricated), the FPGA circuitry 1000 of the example of FIG. 10 includes interconnections and logic circuitry that may be configured and/or interconnected in different ways after fabrication to instantiate, for example, some or all of the machine readable instructions represented by the flowchart of FIG. 7. In particular, the FPGA circuitry 1000 may be thought of as an array of logic gates, interconnections, and switches. The switches can be programmed to change how the logic gates are interconnected by the interconnections, effectively forming one or more dedicated logic circuits (unless and until the FPGA circuitry 1000 is reprogrammed). The configured logic circuits enable the logic gates to cooperate in different ways to perform different operations on data received by input circuitry. Those operations may correspond to some or all of the software represented by the flowchart of FIG. 7. As such, the FPGA circuitry 1000 may be structured to effectively instantiate some or all of the machine readable instructions of the flowchart of FIG. 7 as dedicated logic circuits to perform the operations corresponding to those software instructions in a dedicated manner analogous to an ASIC. Therefore, the FPGA circuitry 1000 may perform the operations corresponding to the some or all of the machine readable instructions of FIG. 7 faster than the general purpose microprocessor can execute the same.

In the example of FIG. 10, the FPGA circuitry 1000 is structured to be programmed (and/or reprogrammed one or more times) by an end user by a hardware description language (HDL) such as Verilog. The FPGA circuitry 1000 of FIG. 10, includes example input/output (I/O) circuitry 1002 to obtain and/or output data to/from example configuration circuitry 1004 and/or external hardware 1006. For example, the configuration circuitry 1004 may be implemented by interface circuitry that may obtain machine readable instructions to configure the FPGA circuitry 1000, or portion(s) thereof. In some such examples, the configuration circuitry 1004 may obtain the machine readable instructions from a user, a machine (e.g., hardware circuitry (e.g., programmed or dedicated circuitry) that may implement an Artificial Intelligence/Machine Learning (AI/ML) model to generate the instructions), etc. In some examples, the external hardware 1006 may be implemented by external hardware circuitry. For example, the external hardware 1006 may be implemented by the microprocessor 900 of FIG. 9. The FPGA circuitry 1000 also includes an array of example logic gate circuitry 1008, a plurality of example configurable interconnections 1010, and example storage circuitry 1012. The logic gate circuitry 1008 and the configurable interconnections 1010 are configurable to instantiate one or more operations that may correspond to at least some of the machine readable instructions of FIG. 7 and/or other desired operations. The logic gate circuitry 1008 shown in FIG. 10 is fabricated in groups or blocks. Each block includes semiconductor-based electrical structures that may be configured into logic circuits. In some examples, the electrical structures include logic gates (e.g., And gates, Or gates, Nor gates, etc.) that provide basic building blocks for logic circuits. Electrically controllable switches (e.g., transistors) are present within each of the logic gate circuitry 1008 to enable configuration of the electrical structures and/or the logic gates to form circuits to perform desired operations. The logic gate circuitry 1008 may include other electrical structures such as look-up tables (LUTs), registers (e.g., flip-flops or latches), multiplexers, etc.

The configurable interconnections 1010 of the illustrated example are conductive pathways, traces, vias, or the like that may include electrically controllable switches (e.g., transistors) whose state can be changed by programming (e.g., using an HDL instruction language) to activate or deactivate one or more connections between one or more of the logic gate circuitry 1008 to program desired logic circuits.

The storage circuitry 1012 of the illustrated example is structured to store result(s) of the one or more of the operations performed by corresponding logic gates. The storage circuitry 1012 may be implemented by registers or the like. In the illustrated example, the storage circuitry 1012 is distributed amongst the logic gate circuitry 1008 to facilitate access and increase execution speed.

The example FPGA circuitry 1000 of FIG. 10 also includes example Dedicated Operations Circuitry 1014. In this example, the Dedicated Operations Circuitry 1014 includes special purpose circuitry 1016 that may be invoked to implement commonly used functions to avoid the need to program those functions in the field. Examples of such special purpose circuitry 1016 include memory (e.g., DRAM) controller circuitry, PCIe controller circuitry, clock circuitry, transceiver circuitry, memory, and multiplier-accumulator circuitry. Other types of special purpose circuitry may be present. In some examples, the FPGA circuitry 1000 may also include example general purpose programmable circuitry 1018 such as an example CPU 1020 and/or an example DSP 1022. Other general purpose programmable circuitry 1018 may additionally or alternatively be present such as a GPU, an XPU, etc., that can be programmed to perform other operations.

Although FIGS. 9 and 10 illustrate two example implementations of the processor circuitry 812 of FIG. 8, many other approaches are contemplated. For example, as mentioned above, modern FPGA circuitry may include an on-board CPU, such as one or more of the example CPU 1020 of FIG. 10. Therefore, the processor circuitry 812 of FIG. 8 may additionally be implemented by combining the example microprocessor 900 of FIG. 9 and the example FPGA circuitry 1000 of FIG. 10. In some such hybrid examples, a first portion of the machine readable instructions represented by the flowchart of FIG. 7 may be executed by one or more of the cores 902 of FIG. 9, a second portion of the machine readable instructions represented by the flowchart of FIG. 7 may be executed by the FPGA circuitry 1000 of FIG. 10, and/or a third portion of the machine readable instructions represented by the flowchart of FIG. 7 may be executed by an ASIC. It should be understood that some or all of the circuitry of FIG. 2 may, thus, be instantiated at the same or different times. Some or all of the circuitry may be instantiated, for example, in one or more threads executing concurrently and/or in series. Moreover, in some examples, some or all of the circuitry of FIG. 2 may be implemented within one or more virtual machines and/or containers executing on the microprocessor.

In some examples, the processor circuitry 812 of FIG. 8 may be in one or more packages. For example, the microprocessor 900 of FIG. 9 and/or the FPGA circuitry 1000 of FIG. 10 may be in one or more packages. In some examples, an XPU may be implemented by the processor circuitry 812 of FIG. 8, which may be in one or more packages. For example, the XPU may include a CPU in one package, a DSP in another package, a GPU in yet another package, and an FPGA in still yet another package.

Figure 11:
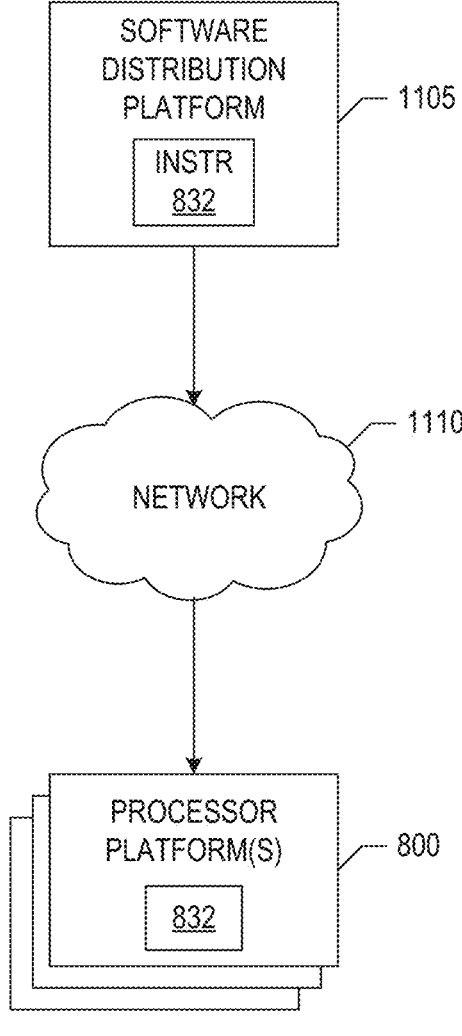
FIG. 11 is a block diagram of an example software distribution platform (e.g., one or more servers) to distribute software (e.g., software corresponding to the example machine readable instructions of FIG. 7) to client devices associated with end users and/or consumers (e.g., for license, sale, and/or use), retailers (e.g., for sale, re-sale, license, and/or sub-license), and/or original equipment manufacturers (OEMs) (e.g., for inclusion in products to be distributed to, for example, retailers and/or to other end users such as direct buy customers).

A block diagram illustrating an example software distribution platform 1105 to distribute software such as the example machine readable instructions 832 of FIG. 8 to networked devices owned and/or operated by third parties is illustrated in FIG. 11. The example software distribution platform 1105 may be implemented by any computer server, data facility, cloud service, etc., capable of storing and transmitting software to other computing devices. The third parties may be customers of the entity owning and/or operating the software distribution platform 1105. For example, the entity that owns and/or operates the software distribution platform 1105 may be a developer, a seller, and/or a licensor of software such as the example machine readable instructions 832 of FIG. 8. The third parties may be consumers, users, retailers, OEMs, etc., who purchase and/or license the software for use and/or re-sale and/or sublicensing. In the illustrated example, the software distribution platform 1105 includes one or more servers and one or more storage devices. The storage devices store the machine readable instructions 832, which may correspond to the example machine readable instructions 700 of FIG. 7, as described above. The one or more servers of the example software distribution platform 1105 are in communication with an example network 1110, which may correspond to any one or more of the Internet and/or any of the example networks 106 described above. In some examples, the one or more servers are responsive to requests to transmit the software to a requesting party as part of a commercial transaction. Payment for the delivery, sale, and/or license of the software may be handled by the one or more servers of the software distribution platform and/or by a third party payment entity. The servers enable purchasers and/or licensors to download the machine readable instructions 832 from the software distribution platform 1105. For example, the software, which may correspond to the example machine readable instructions 700 of FIG. 7, may be downloaded to a networked device, such as the example processor platform 800, which is to execute the machine readable instructions 832 to implement the example video editing system 120. In some examples, one or more servers of the software distribution platform 1105 periodically offer, transmit, and/or force updates to the software (e.g., the example machine readable instructions 832 of FIG. 8) to ensure improvements, patches, updates, etc., are distributed and applied to the software at the end user devices.

From the foregoing, it will be appreciated that example systems, methods, apparatus, and articles of manufacture have been disclosed that automatically edit audio and/or video streams to remove or otherwise conceal voice command(s), such as a voice command used to control a camera during video creation. The voice commands are not intended for the audience of the corresponding video. Instead, the voice commands are artifacts of the video creation process. Examples disclosed herein intelligently remove audio and/or video corresponding to the voice command(s) to eliminate or otherwise conceal such artifacts. This enables users to generate higher quality (e.g., professional quality) videos while reducing (e.g., minimizing) manual editing time.

Examples and example combinations disclosed herein include the following:

Example 1 is a video editing system comprising memory, machine readable instructions, and processor circuitry to at least one of instantiate or execute the machine readable instructions to: detect an audible command in audio data, the audible command to control at least one of a function, an operation, a setting, or a state of a controllable device, edit the audio data to remove the audible command, and cause a file including video data and the audio data to be saved.

Example 2 includes the video editing system of Example 1, wherein the processor circuitry is to edit the audio data by removing or concealing a portion of the audio data during a time segment corresponding to the audible command.

Example 3 includes the video editing system of Examples 1 or 2, wherein the processor circuitry is to edit the audio data by replacing a portion of the audio data during a time segment corresponding to the audible command with second audio data.

Example 4 includes the video editing system of Example 3, wherein the second audio includes background sound from another segment of the audio data.

Example 5 includes the video editing system of Example 1, wherein the processor circuitry is to remove respective portions of the video data and the audio data corresponding to a time segment the audible command occurred.

Example 6 includes the video editing system of any of Examples 1-5, wherein the audible command is an explicit command, and the processor circuitry is to detect the audible command by determining whether the audible command is the explicit command or an implicit command.

Example 7 includes the video editing system of Example 6, wherein the processor circuitry does not edit the audio data in response to the implicit command.

Example 8 includes the video editing system of any of Examples 1-7, wherein the processor circuitry is to determine whether a face of a person appears in the video data during a time segment corresponding to the audible command.

Example 9 includes the video editing system of Example 8, wherein the processor circuitry is to edit the video data to remove the time segment corresponding to the audible command.

Example 10 is a non-transitory machine readable storage medium comprising instructions to be executed to cause processor circuitry to at least: execute an artificial intelligence model to detect an audible command in audio data, the audible command to control at least one of a function, an operation, a setting, or a state of a controllable device, modify the audio data corresponding to the audible command to at least one of remove or hide the audible command, and cause storage of a file including the modified audio data.

Example 11 includes the non-transitory machine readable storage medium of Example 10, wherein the audio data is associated with video data output by a camera, and the audible command is to control the camera.

Example 12 includes the non-transitory machine readable storage medium of Examples 10 or 11, wherein the instructions cause the processor circuitry to modify the audio data by removing or filtering.

Example 13 includes the non-transitory machine readable storage medium of any of Examples 10-12, wherein the instructions cause the processor circuitry to modify the audio data by replacing data with other audio data.

Example 14 includes the non-transitory machine readable storage medium of any of Examples 10-12, wherein the instructions cause the processor circuitry to remove corresponding portions of the video data and the audio data corresponding a time segment the audible command occurred.

Example 15 includes the non-transitory machine readable storage medium of any of Examples 10-14, wherein the audible command is an explicit command, and wherein the instructions cause the processor circuitry to detect the audible command by determining whether the audible command is the explicit command or an implicit command.

Example 16 is an electronic device comprising a camera, a microphone, memory, machine readable instructions, and processor circuitry to at least one of instantiate or execute the machine readable instructions to: access video data output by the camera and audio data output by the microphone during a video recording session, detect an audible command in the audio data, the audible command to control at least one of a function, an operation, a setting, or a state of the camera, edit the audio data to remove the audible command, and cause a video file including the video data and the audio data to be saved.

Example 17 includes the electronic device of Example 16, wherein the processor circuitry is to edit the audio data by removing or concealing a portion of the audio data during a time segment corresponding to the audible command.

Example 18 includes the electronic device of Examples 16 or 17, wherein the processor circuitry is to edit the audio data based on a determination that the audible command is an explicit command.

Example 19 includes the electronic device of any of Examples 16-18, wherein the processor circuitry is to determine whether a face of a person appears in the video data during a time segment corresponding to the audible command.

Example 20 includes the electronic device of Example 19, wherein the processor circuitry is to edit the video data to remove the time segment corresponding to the audible command.

Example 21 is a method comprising accessing a video file including video data and audio data, detecting an audible command in the audio data, the audible command to control at least one of a function, an operation, a setting, or a state of a controllable device, editing the audio data to remove the audible command, and saving a new video file including the video data and the audio data.

Example 22 includes the method of Example 21, wherein the editing of the audio data includes removing or concealing a portion of the audio data during a time segment corresponding to the audible command.

Example 23 includes the method of Examples 21 or 22, wherein the editing of the audio data includes replacing a portion of the audio data during a time segment corresponding to the audible command with other audio data.

Example 24 includes the method of Example 21, wherein the editing of the audio data includes removing a time segment of the video data and the audio data corresponding to the audible command.

Example 25 includes the method of any of Examples 21-14, wherein the audible command is a command to cause a camera to at least one of zoom or focus on an object.

Example 26 is a server comprising first machine readable instructions and processor circuitry to execute second machine readable instructions to cause transmission of the first machine readable instructions to a networked device in response to a request, the first machine readable instructions to cause the networked device to detect an audible command in audio data, the audible command to control at least one of a function, an operation, a setting, or a state of a controllable device, edit the audio data to remove the audible command, and cause a file including video data and the audio data to be saved.

Example 27 includes the server of Example 26, wherein the first machine readable instructions are to cause the networked device to edit the audio data by removing or concealing a portion of the audio data during a time segment corresponding to the audible command.

Example 28 includes the server of Examples 26 or 27, wherein the first machine readable instructions are to cause the networked device to edit the audio data by replacing a portion of the audio data during a time segment corresponding to the audible command with second audio data.

Example 29 includes the server of Example 28, wherein the second audio includes background sound from another segment of the audio data.

Example 30 includes the server of Example 26, wherein the first machine readable instructions are to cause the networked device to remove respective portions of the video data and the audio data corresponding to a time segment the audible command occurred.

Example 31 includes the server of any of Examples 26-30, wherein the audible command is an explicit command, and the first machine readable instructions are to cause the networked device to detect the audible command by determining whether the audible command is the explicit command or an implicit command.

The following claims are hereby incorporated into this Detailed Description by this reference. Although certain example systems, methods, apparatus, and articles of manufacture have been disclosed herein, the scope of coverage of this patent is not limited thereto. On the contrary, this patent covers all systems, methods, apparatus, and articles of manufacture fairly falling within the scope of the claims of this patent.

What is claimed is:

1. A video editing system comprising:

memory;

machine readable instructions; and at least one processor circuit to at least one of instantiate or execute the machine readable instructions to:

detect a first audible command in audio data, the first audible command to control at least one of a function, an operation, a setting, or a state of a controllable device;

determine whether a human face appears in video data during a first time segment corresponding to the first audible command;

in response to determining the human face appears in the video data during the first time segment, remove respective portions of the audio data and the video data corresponding to the first time segment;

detect a second audible command in the audio data;

determine whether the human face appears in the video data during a second time segment corresponding to the second audible command;

in response to determining the human face does not appear in the video data during the second time segment, edit the audio data to remove the second audible command without changing the video data corresponding to the second time segment; and cause a file including video data and the audio data to be saved.

2. The video editing system of claim 1, wherein one or more of the at least one processor circuit is to edit the audio data by removing or concealing a portion of the audio data occurring during the second time segment.

3. The video editing system of claim 1, wherein one or more of the at least one processor circuit is to edit the audio data corresponding to the second time segment by replacing a portion of the audio data during the second time segment with second audio data.

4. The video editing system of claim 3, wherein the second audio data includes background sound from another segment of the audio data.

5. The video editing system of claim 1, wherein one or more of the at least one processor circuit is to detect a third audible command occurring during a third time segment in the audio data, and one or more of the at least one processor circuit is to determine whether the third audible command is an implicit command or an explicit command.

6. The video editing system of claim 5, wherein, in response to determining the third audible command is an implicit command, one or more of the at least one processor circuit does not edit the audio data occurring during the third time segment.

7. The video editing system of claim 1, wherein one or more of the at least one processor circuit is to execute a machine learning model to determine whether the human face appears in the video data.

8. A non-transitory machine readable storage medium comprising instructions to be executed to cause at least one processor circuit to at least:

execute an artificial intelligence model to detect an audible command in audio data, the audible command to control at least one of a function, an operation, a setting, or a state of a controllable device;

determine whether the audible command is an explicit command or an implicit command, an explicit command being a direct command to control the controllable device, an implicit command being part of a user's speech or conversation intended for consumption by a human;

in response to determining the audible command is an explicit command, modify the audio data corresponding to the audible command to at least one of remove or hide the audible command;

in response to determining the audible command is an implicit command, not modify the audio data corresponding to the audible command to at least one of remove or hide the audible command; and cause storage of a file including the modified audio data.

9. The non-transitory machine readable storage medium of claim 8, wherein the audio data is associated with video data output by a camera, the explicit command is to control the camera.

10. The non-transitory machine readable storage medium of claim 8, wherein the instructions cause one or more of the at least one processor circuit to modify the audio data by removing or filtering.

11. The non-transitory machine readable storage medium of claim 8, wherein the instructions cause one or more of the at least one processor circuit to modify the audio data by replacing data with other audio data.

12. The non-transitory machine readable storage medium of claim 8, wherein the instructions cause one or more of the at least one processor circuit to remove corresponding portions of video data and the audio data corresponding to a time segment the audible command occurred.

13. An electronic device comprising:

a camera;

a microphone;

memory;

machine readable instructions; and at least one processor circuit to at least one of instantiate or execute the machine readable instructions to:

access video data output by the camera and audio data output by the microphone during a video recording session;

detect a first audible command in the audio data, the first audible command to control at least one of a function, an operation, a setting, or a state of the camera;

determine whether a human face appears in the video data during a first time segment corresponding to the first audible command;

in response to determining the human face appears in the video data during the first time segment, remove respective portions of the audio data and the video data corresponding to the first time segment;

detect a second audible command in the audio data;

determine whether the human face appears in the video data during a second time segment corresponding to the second audible command;

in response to determining the human face does not appear in the video data during the second time segment, edit the audio data to remove the second audible command without changing the video data corresponding to the second time segment; and cause a video file including the video data and the audio data to be saved.

14. The electronic device of claim 13, wherein one or more of the at least one processor circuit is to edit the audio data by removing or concealing a portion of the audio data occurring during the second time segment.

15. The electronic device of claim 13, wherein one or more of the at least one processor circuit is to edit the audio data corresponding to the second time segment based on a determination that the second audible command is an explicit command.

16. The electronic device of claim 13, wherein one or more of the at least one processor circuit is to execute a machine learning model to determine whether the human face appears in the video data.

17. The electronic device of claim 13, wherein one or more of the at least one processor circuit is to edit the audio data corresponding to the second time segment by replacing a portion of the audio data during the second time segment with second audio data.

18. The electronic device of claim 17, wherein the second audio data includes background sound from another segment of the audio data.

* * * * *